United States Patent
Hauru et al.

(10) Patent No.: US 12,553,187 B2
(45) Date of Patent: Feb. 17, 2026

(54) DISPERSION OF CELLULOSE FIBERS AND METHOD OF PRODUCING THE SAME

(71) Applicant: Metsä Fibre Oy, Metsä (FI)

(72) Inventors: Lauri Hauru, Helsingin yliopisto (FI); Ilkka Kilpeläinen, Helsingin yliopisto (FI); Olli Suontausta, Metsä (FI); Alexander Deutschle, Metsä (FI)

(73) Assignee: Metsä Fibre Oy, Metsä (FI)

( * ) Notice: Subject to any disclaimer, the term of this patent is extended or adjusted under 35 U.S.C. 154(b) by 733 days.

(21) Appl. No.: 17/788,294

(22) PCT Filed: Dec. 18, 2020

(86) PCT No.: PCT/FI2020/050859
§ 371 (c)(1),
(2) Date: Jun. 23, 2022

(87) PCT Pub. No.: WO2021/130412
PCT Pub. Date: Jul. 1, 2021

(65) Prior Publication Data
US 2023/0057864 A1    Feb. 23, 2023

(30) Foreign Application Priority Data
Dec. 23, 2019 (FI) .................... 20196131

(51) Int. Cl.
*D21H 21/08* (2006.01)
*A22C 13/00* (2006.01)
(Continued)

(52) U.S. Cl.
CPC ......... *D21H 21/08* (2013.01); *A22C 13/0013* (2013.01); *D21H 11/02* (2013.01);
(Continued)

(58) Field of Classification Search
CPC ........ D21H 21/08; D21H 11/02; D21H 17/14; D21H 19/34; D21H 27/06; C08L 1/02
See application file for complete search history.

(56) References Cited

U.S. PATENT DOCUMENTS

| 3,782,977 A | 1/1974 | Henderson et al. |
| 8,500,956 B2 * | 8/2013 | Sixta ............ D21C 9/002 |
| | | 162/42 |

(Continued)

FOREIGN PATENT DOCUMENTS

| CN | 101346416 A | 1/2009 | |
| CN | 103619922 A * | 3/2014 | ........... C08J 5/00 |

(Continued)

OTHER PUBLICATIONS

English Machine trasnaltion CN103619922A, 2014. (Year: 2014).*
(Continued)

*Primary Examiner* — Anthony Calandra
(74) *Attorney, Agent, or Firm* — Laine IP Oy

(57) ABSTRACT

A dispersion of cellulose fibers, a method of preparing the same and uses thereof. The dispersion is produced by providing a cellulose feedstock comprising cellulose fibers; by providing a mixture of an ionic liquid and a protic antisolvent for cellulose as a dispersion medium, the ionic liquid being selected from the group of protic salts of superbases capable of dissolving cellulose; and by mixing said cellulose feedstock into said dispersion medium so as to disperse the cellulose fibers therein to form a dispersion which is stable for at least 24 hours at room temperature. The dispersion can be used as an additive of cellulose pulps for making of fibrous products.

20 Claims, 5 Drawing Sheets

(51) Int. Cl.
D21H 11/02 (2006.01)
D21H 17/14 (2006.01)
D21H 19/34 (2006.01)
D21H 27/06 (2006.01)

(52) U.S. Cl.
CPC ............ *D21H 17/14* (2013.01); *D21H 19/34* (2013.01); *D21H 27/06* (2013.01)

(56) References Cited

U.S. PATENT DOCUMENTS

| | | | |
|---|---|---|---|
| 2013/0292075 A1 | 11/2013 | Laine et al. | |
| 2015/0107790 A1* | 4/2015 | Sixta | C08B 37/0057 162/76 |
| 2016/0053407 A1* | 2/2016 | Michud | D01F 2/02 536/56 |
| 2019/0376236 A1* | 12/2019 | Sixta | D21C 11/00 |

FOREIGN PATENT DOCUMENTS

| | | | |
|---|---|---|---|
| CN | 106702800 A | 5/2017 | |
| DE | 102005062608 A1 | 7/2007 | |
| DE | 102007019650 A1 | 10/2008 | |
| WO | WO2008119770 A1 | 10/2008 | |
| WO | WO-2013171364 A1 * | 11/2013 | ............ C08B 1/003 |
| WO | WO2014162062 A1 | 10/2014 | |
| WO | WO2014207100 A1 | 12/2014 | |
| WO | WO2015163291 A1 | 10/2015 | |
| WO | WO2018138416 A1 | 8/2018 | |
| WO | WO2018234638 A1 | 12/2018 | |

OTHER PUBLICATIONS

English Summary of CN-105295069-A, 2016. (Year: 2016).*
Kuzima et al., Superbase ionic liquids for effective cellulose processing from dissolution to carbonisation, 2017, Green Chemistry, 19, 549-5957. (Year: 2017).*
Elhi et al: Ionic liquids as solvents for making composite materials from cellulose. Proceedings of the Estonian Academy of Sciences, 2016, vol. 65, No. 3, pp. 255-266.
Hauru et al: Role of Solvent Parameters in the Regeneration of Cellulose from Ionic Liquid Solutions. Biomacromolecules, Aug. 7, 2012, vol. 13, pp. 2896-2905.
Kuzmina et al: Superbase ionic liquids for effective cellulose processing from dissolution to carbonisation. Green Chemistry, 2017, vol. 19, pp. 5949-5957.
Olsson et al: Influence of water on swelling and dissolution of cellulose in 1-ethyl-3-methylimidazolium acetate. Carbohydrate Polymers, 2014, vol. 99, No. 2014, pp. 438-446.
Parviainen et al: Sustainability of cellulose dissolution and regeneration in 1,5-diazabicyclo[4.3.0]non-5-enium acetate: a batch simulation of the IONCELL-F process. RSC Advances, 2015, vol. 5, pp. 69729-69737.
Sixta et al: Ioncell-F: A High-strength regenerated cellulose fibre. Nordic Pulp & Paper Research Journal, 2015, vol. 30, No. 1, pp. 43-57.

* cited by examiner

DISPERSION OF CELLULOSE FIBERS AND METHOD OF PRODUCING THE SAME

FIELD OF INVENTION

The present invention relates to the formation of stable dispersions of cellulose fibers. In particular the present invention concerns a dispersion comprising cellulose fibers dispersed in a dispersion medium, to a method of producing such dispersions and to uses of the dispersions.

BACKGROUND

Current processes for finely dispersing pulp require functionalization of the pulp. For example, in a TEMPO oxidation process a proportion (~1/6) of the hydroxyl groups in cellulose are oxidized to carboxylic acid groups, converting the cellulose into a cellulose carboxylate. This material can then be dispersed with a grinder.

SUMMARY OF THE INVENTION

It is an aim of the present invention of providing a way of producing dispersions in particular from non-functionalized cellulose.

It is another aim of the present invention to provide stable dispersions of cellulose fibers optionally subjected to a mechanical treatment, for example by defibration.

It is still a third aim of the present invention to provide new uses of the dispersion.

The present invention is based on the concept of dispersing cellulose fibers in a mixture of an ionic liquid and a protic antisolvent for cellulose. The ionic liquid is preferably being selected from the group of protic salts of organic superbases capable of dissolving cellulose. The dispersion thus obtained is stable for example at room temperature for at least 24 hours In the method, a dispersion containing cellulose fibers dispersed in a dispersion medium, by the steps of
 providing a cellulose feedstock comprising cellulose fibers;
 providing a mixture of an ionic liquid and a protic antisolvent for cellulose as a dispersion medium, the ionic liquid being selected from the group of protic salts of superbases capable of dissolving cellulose; and
 mixing said cellulose feedstock into said dispersion medium so as to disperse the cellulose fibers therein to form a dispersion which is stable for at least 24 hours at room temperature.

The dispersion can be used for examples as an additive of cellulose pulps for making of fibrous products.

More specifically, the present invention is mainly characterized by what is stated in the independent claims.

Considerable advantages are obtained by the invention.

Cellulosic fibers can be dispersed without functionalization of the cellulose by using a better solvent than water. Unlike functionalization, solvation is reversible.

By the present compositions comprising, or consisting of, or consisting essentially of, a cellulose-dissolving ionic liquid and a protic antisolvent (such as, for example water, ethanol, propanol, butanol or combinations thereof) at a ratio at which the mixture of the ionic liquid and the antisolvent will be capable of primarily achieving swelling of cellulose rather than dissolution of it. It would appear that swelling proceeds to the collapse of the material under its own weight, forming a dispersion of undissolved fibers. But this is merely one explanation and the scope is not limited to it.

Typically, the dispersion comprises the fibers distributed throughout the dispersion medium, and present in swollen state, such that it is not possible to separate solid matter by filtration.

Further, the use of a dispersion medium of the present kind will give a dispersion which has a lower viscosity and less degradation of the original structure of the cellulose than compositions where cellulose is dissolved. This opens up for the mixing of the dispersions into various dispersions and slushes of other cellulosic and lignocellulosic materials and, thus, for a number of new uses of the dispersions.

Next, embodiments of the present technology will be disclosed in more detail with reference to the attached drawings.

FIG. 5 is a photograph showing the testing for absorption of a drop of water, sample 2 (Masuko ground). Left side: coated side, where water would evaporate nearly completely, vs. right side, untreated cardboard, where water would be mostly retained; and.

EMBODIMENTS

Figure 1:
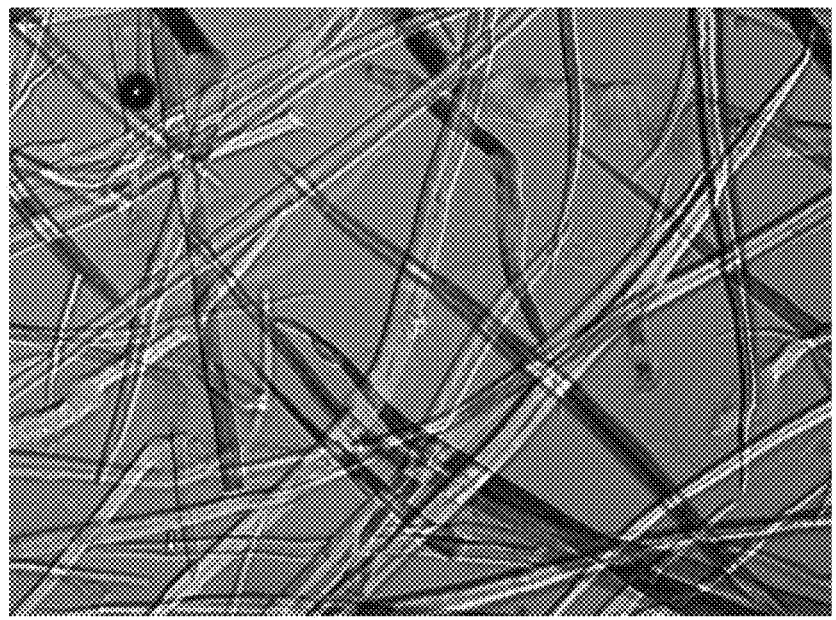
FIG. 1 is an optical micrograph showing a 10× magnification through crossed polarizers for Enocell dissolving pulp suspended in [TMGH]OAc·$H_2O$—the color difference to background signifies optical anisotropy, which reveals the presence of undissolved material.

In an embodiment, a dispersion of the present kind comprises cellulose fibers dispersed in a mixture of an ionic liquid and a protic antisolvent for cellulose. The ionic liquid is selected from the group of protic salts of organic superbases capable of dissolving cellulose. The dispersion is stable at room temperature for at least 24 hours, for example for 36 to 180 hours or even more.

In an embodiment, the present dispersion is a suspension that is stable at room temperature for at least 24 hours, for example for 36 to 180 hours or even more.

In the present context, the term "stable" signifies that less than 20%, in particular less than 15%, for example less than 10%, suitably less than 5% and possibly even less than 1% of the dispersed solid matter (in particular cellulose fibers) by weight, calculated from the total amount of dispersed matter in the dispersion, will settle out of the dispersion upon standing at room temperature. Typically, less than 10%, in particular less than 5%, by weight of the total weight of dispersed fibers settles out from the dispersion over a time period of 24 hours or more, in particular over a time period of 36 to 48 hours, upon standing at room temperature.

"Room temperature" stands for a temperature of about 15 to 30° C., in particular 15 to 25° C., for example about 23° C.

In the present context, the term "mixture" will be used to denote a liquid mixture of at least two components, one of which is an ionic liquid and the other of which is a protic compound, in particular a protic antisolvent for cellulose.

"Antisolvent" stands for a substance which is, as such, incapable of dissolving cellulose at least at the conditions employed for forming the dispersion.

"Protic" for example used in connection with "protic antisolvent" and "protic salt" has the conventional meaning of a compound which has a hydrogen atom bound to an oxygen, in particular to an oxygen as in a hydroxyl group.

The term "superbase" stands for an organic compound whose basicity is greater than that of proton sponge, which has a conjugate pKa of 12.1. The term is used in analogous way to the term superacid (cf. IUPAC Gold Book, https://goldbook.iupac.org/terms). Examples of organic superbases include the following: protonated amidines, protonated guanidines, and combinations thereof.

"Colloidal dispersion" stands for a dispersion in which the dispersed matter has a smallest particle size in the range of 1 to 1000 nm. In the case of fibers, the thickness typically is the smallest particle size. The thickness of the present dispersed fibers can be determined based on micrographs, such as optical micrographs, of the fibers.

"Unmodified cellulose fibers" stands for cellulose fibers which have not been chemically functionalized for example by forming into cellulose derivatives, i.e. in chemical cellulose derivatives.

Unless otherwise indicated, any percentages are given as weight percentages, typically calculated from the total weight of the compositions.

Any weights and weight percentages given for solid matter are based on the dry weight of the matter, unless otherwise indicated.

Similarly, any ratios given, unless otherwise indicated, are given as weight ratios.

The abbreviation "IL" stands for ionic liquid.

The dispersion contains, in one embodiment, at least 90%, preferably at least 95%, for example at least 97%, such as at least 99.5% by weight of the cellulose fibers dispersed in the mixture of the ionic liquid and the protic antisolvent.

Thus, preferably the concentration of any dissolved cellulose fibers will be small, in practice the dispersions will be free or essentially free from dissolved cellulose fibers. Since the cellulose fibers are solvated rather than dissolved, they will after dispersion still exhibit crystallinity, in particular cellulose I crystallinity.

The cellulose fibers can be subjected to mechanical defibration before, during or preferably after dispersion of the cellulose fibers in the mixture formed by the ionic liquid and the protic antisolvent.

By defibration, it is possible to loosen up any fiber bundles so as to reduce the size of the dispersed fibrous matter. In embodiments it is possible by mechanical defibration to increase the proportion of individual fibers dispersed in the mixture.

Mechanical defibration can be carried out, for example by mechanical grinding or milling, in particular with the aid of a friction grinder, such as an ultra-fine friction grinding machine. One example of a suitable mechanical grinder is a colloid mill or colloid grinder, such as the Masuko grinder.

In one embodiment, the cellulose fibers are virgin fibers. In one embodiment, the cellulose fibers comprise recycled fibers. In one embodiment, the cellulose fibers are fibers of unmodified cellulose. In one embodiment, the cellulose fibers are obtained from chemical pulp, for example bleached cellulosic pulp, such as paper grade pulp or dissolving pulp.

Typically, the fibers contain less than 15%, for example less than 10%, in particular less than 5%, hemicellulose. As a result, the dispersion will contain less than 15%, for example less than 10%, in particular less than 5%, hemicellulose, calculated from the total amount of cellulose and hemicellulose present in the dispersion. It has been found that hemicellulose present in the cellulose raw-material will not impair the formation of a dispersion of cellulose in the mixture of the ionic liquid and the protic antisolvent. Usually, the hemicellulose will be dissolved at least partially, often completely, in the dispersion medium for the cellulose.

In one embodiment, a dispersion comprises cellulose fibers dispersed in a mixture of an ionic liquid and a protic antisolvent for cellulose. The ionic liquid is selected from the group of protic superbases. The ionic liquid is preferably selected from the group consisting of protonated amidines, protonated guanidines, and combinations thereof. The counter-ion of the protic superbases is typically an anion.

The anion is for example selected from chloride, acetate, propionate, alkylated phosphate or from a similar simple, small-molar mass ion. The anion is capable, together with the superbase, of forming an ionic liquid having a melting point lower than 150° C., in particular lower than about 90° C.

In one embodiment, the ionic liquid is selected from the group of
1,1,3,3-tetramethylguanidium acetate monohydrate ([TMGH]OAc·H$_2$O);
1,5-diazabicyclo[4.3.0]non-5-enium acetate dihydrate ([DBNH]OAc·2H$_2$O);
7-methyl-1,5,7-triazabicyclo[4.4.0]dec-5-enium acetate trihydrate ([MTBDH]OAc·3H$_2$O); and
1,5-diazabicyclo[4.3.0]non-5-enium acetate with 0.3 equivalents of acetic acid ([DBNH]OAc·0.3AcOH:

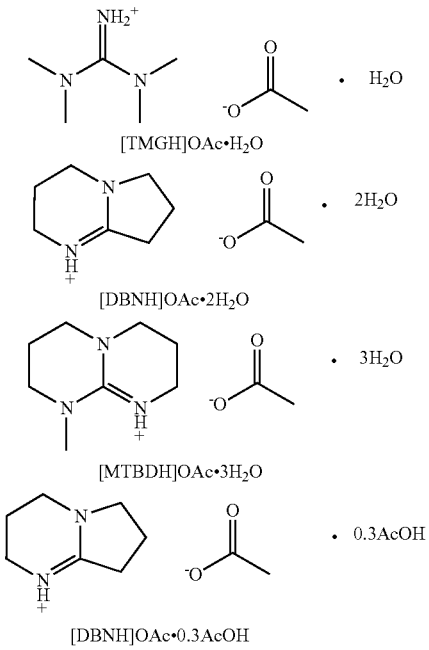

Ionic liquids synthesized from an organic superbase, such as an amidine or guanidine, and a carboxylic acid can be distillable. With regard to these ionic liquids reference is made to the following publications the contents of which are herewith incorporated in full: King, A. W. T.; Asikkala, J.; Mutikainen, I.; Järvi, P.; Kilpeläinen, I., Distillable Acid-Base Conjugate Ionic Liquids for Cellulose Dissolution and Processing. Angewandte Chemie International Edition 2011, 50 (28), 6301-6305. doi.org/10.1002/anie.201100274) and applied patents concerning these ionic liquids (e.g. Michud, A.; King, A.; Parviainen, A.; Sixta, H.; Hauru, L.; Hummel, M.; Kilpeläinen, I. Process for the production of shaped cellulose articles. WO2014162062A1, 2014; Hauru, L. K. J.; King, A. W. T.; Kilpeläinen, I. A. Method of joining polymeric biomaterials; Finnish Patent Application No. 20175596.

In one embodiment, the protic antisolvent for cellulose is selected from OH-group containing compounds which are liquids at the temperature used for dispersion of the cellulose fibers. In particular the protic antisolvent is selected from the group of water, alkanol, aromatic alcohols, alkane acid, for example from water, n- or iso-alcohols, such as ethanol, n-propanol, isopropanol, n-butanol, isobutanol and tert-butanol, acetic acid, and combinations and mixtures thereof.

In one embodiment, the protic antisolvent for cellulose comprises a mixture or solution of water and an alcohol, such as ethanol, n- or isopropanol, n-, i- or tert-butanol or acetic acid.

The weight ratio of water and alcohol is typically 10:90 to 90:10, for example 20:80 to 80:20, such as 40:60 to 60:40.

In one embodiment, the mixture of an ionic liquid and a protic antisolvent for cellulose comprises
  an ionic liquid selected from the group of 1,1,3,3-tetramethylguanidium acetate monohydrate ([TMGH]OAc·$H_2O$); 1,5-diazabicyclo[4.3.0]non-5-enium acetate dihydrate ([DBNH]OAc·$2H_2O$); 7-methyl-1,5,7-triazabicyclo[4.4.0]dec-5-enium acetate trihydrate ([MTBDH]OAc·$3H_2O$); and 1,5-diazabicyclo[4.3.0]non-5-enium acetate with 0.3 equivalents of acetic acid ([DBNH]OAc·0.3AcOH), and
  a protic antisolvent selected from the group of water and an n- or iso-alcohol, such as ethanol, n-propanol, isopropanol, n-butanol and isobutanol, acetic acid, and combinations thereof.

In one embodiment, the molar ratio between the protic antisolvent for cellulose to the ionic liquid is about 1:50 to 50:1, in particular about 1:10 to 10:1, for example about 1:5 to 5:1.

In one embodiment, the dispersion will contain 0.01 to 30%, in particular about 0.05 to 10%, for example 0.1 to 5% cellulose calculated based on the weight of the mixture of the ionic liquid and the protic antisolvent for cellulose.

In one embodiment, the dispersion is a colloidal dispersion. Thus, at least 10%, for example at least 20%, in particular at least 30%, preferably at least 50% by weight, of the cellulose fibers dispersed have a smallest diameter of less than 1000 nm, in particular less than 500 nm, for example less than 250 nm or less than 100 nm. The percentage is calculated for the total weight of the dispersed cellulose fibers.

In one embodiment, a method of producing a dispersion containing cellulose fibers dispersed in a dispersion medium, comprises the steps of
  providing a cellulose feedstock comprising cellulose fibers;
  providing a mixture of an ionic liquid and a protic antisolvent for cellulose as a dispersion medium, the ionic liquid being selected from the group of protic salts of superbases capable of dissolving cellulose; and
  mixing the cellulose feedstock into said dispersion medium so as to disperse the cellulose fibers therein to form a dispersion which is stable for at least 24 hours at room temperature.

As referred to above, the cellulose feedstock can be selected from cellulose pulp, in particular cellulose pulps which contain unmodified cellulose fibers. In one embodiment, the cellulose feedstock comprises chemical pulp, for example produced by kraft pulping, sulfite pulping, sulphide pulping or organosolv pulping. The pulp can comprise pulp which has been subjected to hydrolysis, such as acid or alkaline hydrolysis, after pulping.

In one embodiment, the cellulose pulp is free from lignin, or contains less than about 5% lignin, in particular less than about 1% lignin, by weight of the fibers.

In one embodiment, the cellulose feedstock comprises bleached chemical pulp, such as bleached paper grade pulp or bleached dissolving pulp.

The term "paper grade pulp" stands for pulp which is suitable for manufacturing of paper. Such a pulp conventionally contains up to, but typically less than, 20%, in particular 15%, by weight of hemicellulose, calculated from the total weight of the pulp.

The term "dissolving pulp" stands for pulp which is suitable for being dissolved, typically either in a solvent or by derivatization into a solution. The dissolved pulp can then, for example, be spun into fibers or chemically reacted to produce cellulose derivatives. The dissolving pulp typically contains up to, but in particular less than 10%, by weight of hemicellulose, calculated from the total weight of the pulp.

The cellulose feedstock can be obtained from wood raw-materials or from annual or perennial plants. Preferably the feedstock is obtained from wood, such as hardwood, such as birch, maple, oak, alder, aspen, poplar, eucalyptus, abaca or tropical mixed hardwood, or softwood, such as pine or spruce or combinations thereof. The cellulose feedstock can be obtained from virgin fibers, or it can comprise recycled cellulose fibers.

In one embodiment, the molar ratio between the protic antisolvent for cellulose to the ionic liquid is selected in the range from 1:50 to 50:1, in particular 1:10 to 10:1, for example at 1:5 to 5:1, so as to maintain at least 90% of the cellulose fibers dispersed in the dispersion over a time period of at least 24 hours at room temperature.

In one embodiment, the molar ratio between the protic antisolvent for cellulose to the ionic liquid is selected such that the cellulose fibers dispersed will exhibit cellulose I crystallinity. Such crystallinity can be assessed by x-ray diffraction (XRD) and in particular with x-ray powder diffraction (XRDP). The fact that such crystallinity can be determined bears evidence that the fibrous cellulose present in dispersed form has not been dissolved but rather only swollen and solvated in the dispersion medium.

Dispersion of the cellulosic feedstock is carried out at a temperature at which the mixture remains a liquid. Thus, in one embodiment, dispersion is carried out, at normal pressure, at a temperature of about 1 to 99° C., in particular 10 to 95° C., for example at 25 to 90° C.

In a second stage, the dispersion obtained is subjected to mechanical defibration, for example by mechanical grinding, in particular mechanical grinding in a grinding zone of a grinder, for example in a friction grinder, such as a machine for ultra-fine friction grinding.

In one embodiment, the fibrous suspension of pulp is subjected to colloid milling.

In a colloid mill, the material is forced through the gap between two rough stones, which are rotated at ca. 1000 to 2000 rpm, for example 1500 rpm. The machine usually used is the "Masuko grinder", i.e. the Masuko Supermasscolloider by Masuko Sangyo Ltd. of Japan. Typically, the suspension is fed through the colloid mill multiple times, with each step disintegrating the pulp more. Loose material is ripped out and dispersed, and fibers are torn apart.

In one embodiment, the dispersion is subjected to repeated grinding by passing the dispersion through the grinding zone of a grinder, in particular the dispersion is subjected to 2 to 10 passes through a grinding zone of a grinder.

The liquid mixture used for dispersion will achieve better solvation of the fibers than water. Compared to milling with water as the milling medium, dispersion is therefore significantly improved.

After the optional grinding or milling stage, the dispersion can be recovered and stored or conducted to further processing or use. In a further processing step, various components can be admixed of co-dispersed with the dispersion.

In one embodiment, the invention comprises colloid milling of pulp, where the milling medium is, instead of plain water, an ionic liquid inhibited by an antisolvent such as water.

In one embodiment, the cellulose fiber dispersion is used as an additive of cellulose pulps for making of fibrous products.

As a paper additive, the ionic liquid dispersion (or "IL suspension") can be dispersed directly into a slurry of paper grade pulp to form the stock. The IL suspension is mixed, preferably intimately, mixed with the pulp fibers. A typical consistency is 0.1-1 wt-% pulp in water, including both the paper grade pulp and the IL-dispersed pulp. The IL-dispersed pulp comprises ca. 10 to 30%, for example about 20% of the total pulp. The stock is formed into paper, in particular by conventional methods, and dried.

In one embodiment, the cellulose fiber dispersion is used for coating of a porous surface, such as a fibrous substrate. The fibrous substrate typically comprises paper or paperboard, but also other kinds of porous substrates and surfaces can be coated.

In one embodiment, the invention includes the application of the pulp, in particular milled pulp, as a strength-improving additive in paper, or as a precursor to films and coatings.

In one embodiment, the dispersion is applied onto the substrate to provide a coating which is dried to form a dry layer or film on the substrate or surface thereof. The layer or film can be self-standing after drying and separately used. To that end, the layer or film is peeled off from the substrate. Alternatively, the layer or film can be left upon the substrate or surface thereof.

In one embodiment, the dispersion is applied onto the substrate or similar surface by blade coating, jet coating, spray coating, film transfer coating, curtain coating or brush coating or a combination thereof.

In one embodiment, the dispersion is dispersed into water before application onto a fibrous substrate or similar porous surface. Typically, the weight ratio of dispersion to water is about 5:95 to 90:10, for example 10:90 to 80:20, such as 30:70 to 70:30.

In one embodiment, the dispersion is used for producing an artificial sausage casing or parchment paper. To that end the dispersion is, for example, applied onto a fibrous substrate, e.g. a sheet or web of a paper, the dispersion is at least partially impregnated into the substrate, and the dispersion medium is then removed for example by evaporation from the substrate thus obtained.

In one embodiment, the fibrous substrate comprises hardwood or softwood cellulose fibers. In one embodiment, the fibrous substrate comprises paper or paperboard, in particular paper, manufactured from hardwood, e.g. abaca, pulp.

The following non-limiting examples illustrate embodiments of the present technology.

Example 1

AcOH (866.77 g) was added dropwise over 1 h into a mixture of TMG (1663.03 g) and water (259.60 g), to obtain 2789.40 g [TMGH]OAc·H$_2$O with a final temperature of 87° C. 56.94 g of oven-dry dissolving pulp (Enocell, Stora Enso, Finland), in the form of 1-3 cm long pieces, was added, to obtain a 2 m-% suspension.

FIG. 1 is an optical micrograph which, at 10× magnification through crossed polarizers, shows a dispersion of the Enocell dissolving pulp suspended in [TMGH]OAc·H$_2$O. Color difference to background signifies optical anisotropy, which reveals the presence of undissolved material.

Figure 2:
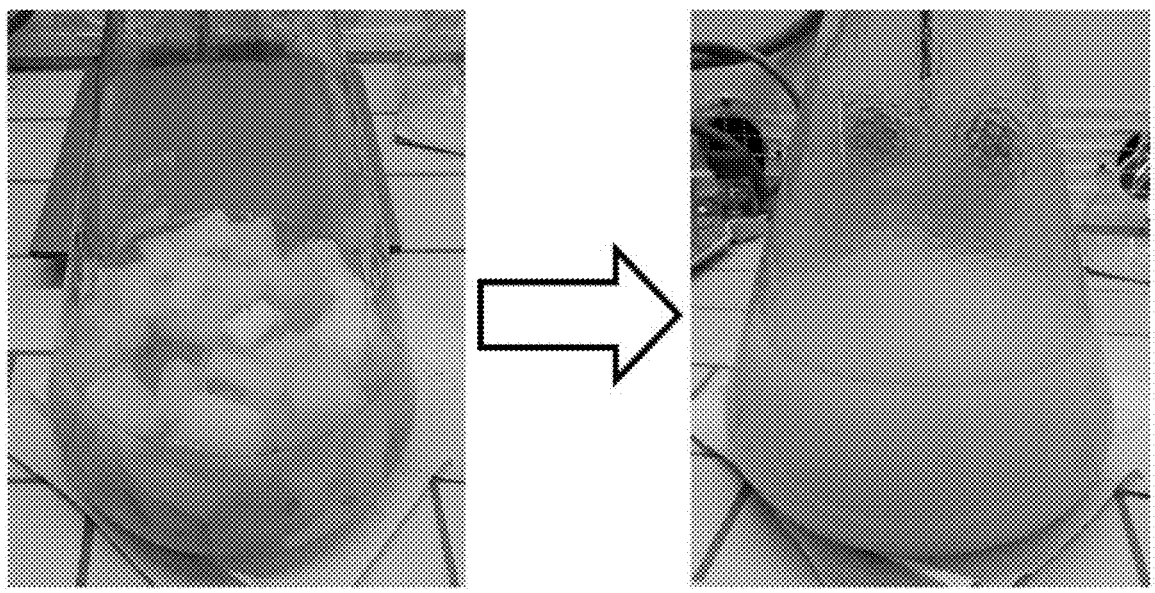
FIG. 2 is a photograph of a dispersion of pulp with [TMGH]OAc·$H_2O$.

Dispersion occurred within 2 min at 87° C. (FIG. 2).

The suspension was fed five times through a colloid mill (Masuko MKZA 10-15J Supermasscolloider), with a stone gap of 230 μm and rotation rate 1500 rpm.

Figure 3:
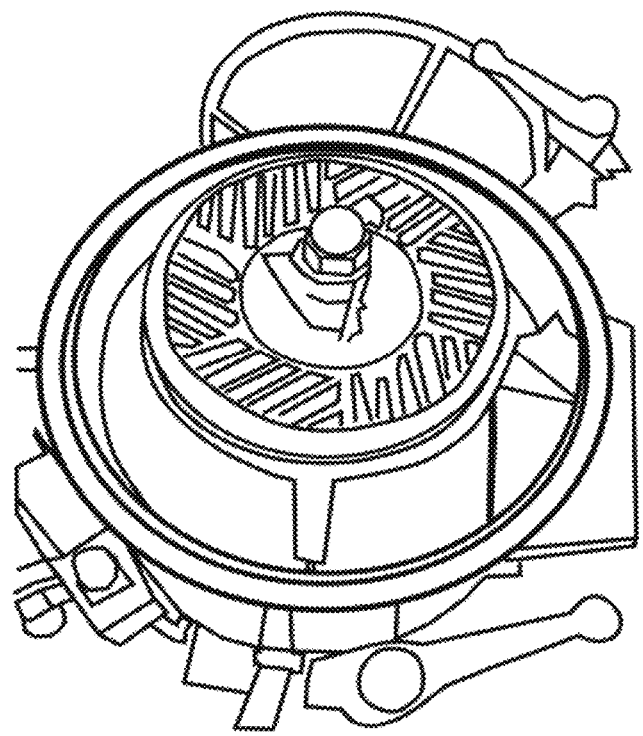
FIG. 3 illustrates one of the stones of the Masuko grinder. The lid includes another stone of the same design, and when closed, they are 230-250 μm from each other.

FIG. 3 shows one of the stones of the Masuko grinder. The stone is made of SiC/Al$_2$O$_3$. The lid includes another stone of the same design, and when closed, they are 230-250 μm from each other.

Figure 4A:
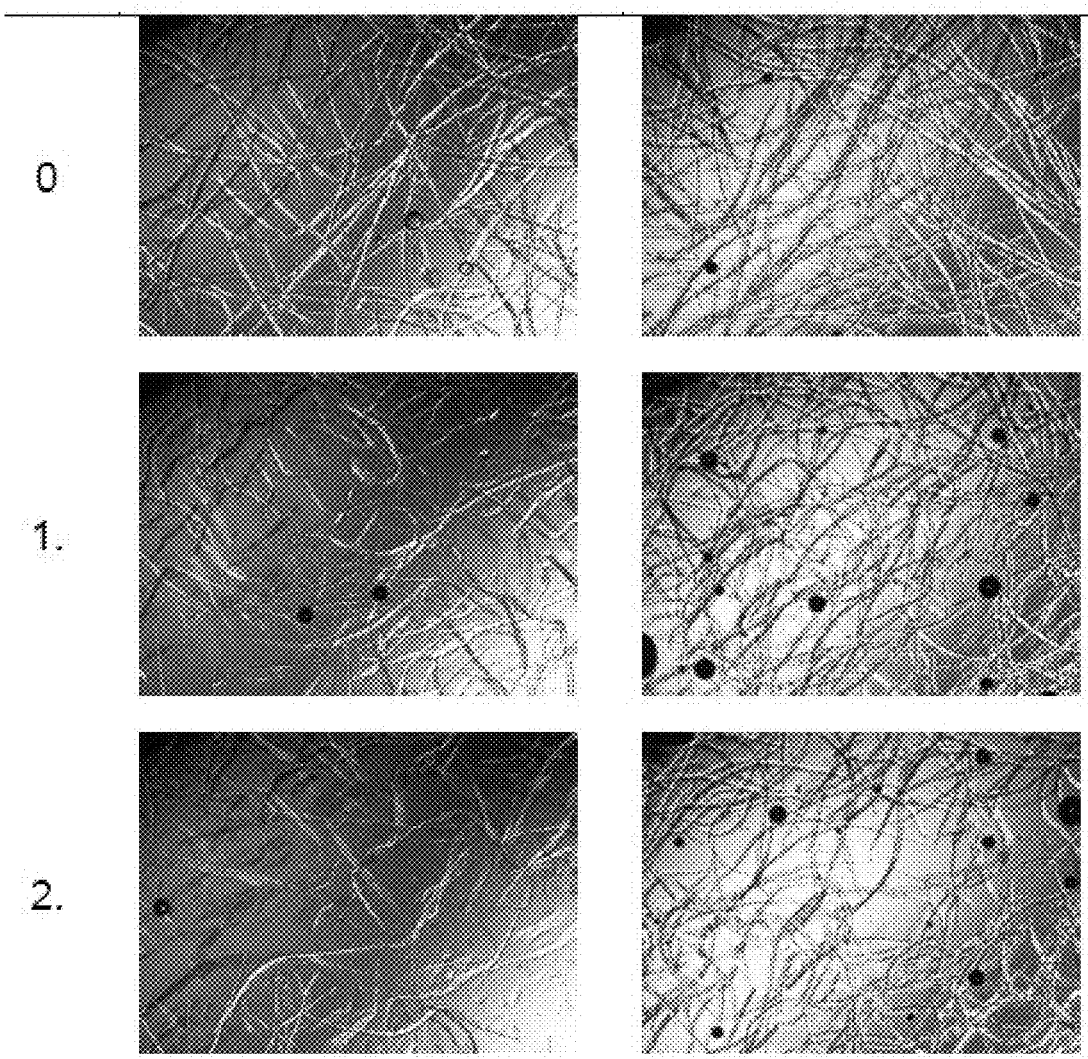
FIGS. 4A and 4B are optical micrographs showing a 4× magnification of dissolving pulp (left) and paper-grade kraft pulp (right) subjected to colloid milling by the number of passes through the mill.
Figure 4B:
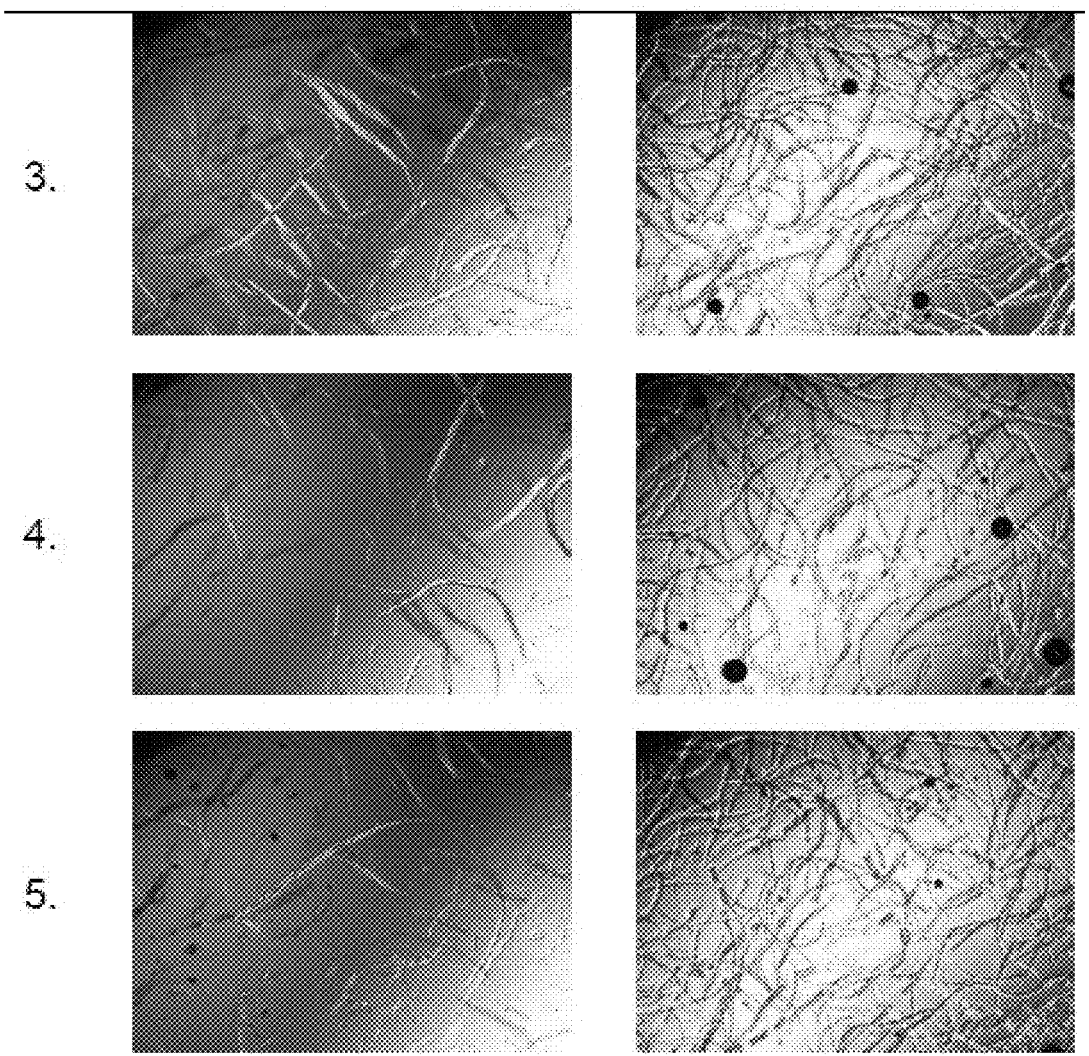

The optical micrograph of FIGS. 4A and 4B show a 4× magnification of dissolving pulp (left) and paper-grade kraft pulp (right) dispersions subjected to colloid milling by the number of passes through the mill.

A sample of the suspension was imaged with an optical microscope after each step (FIG. 4A, left).

Example 2

As Example 1, except the pulp was replaced by paper-grade pulp. Dispersion was achieved though the efficiency of dispersion was lower, with more fibers retained (FIG. 4B, right). For the materials of both Example 1 and Example 2, crystallinity of the solvated matter was studied and the presence of cellulose I crystallinity was confirmed by x-ray powder diffraction (XRDP).

Both dispersions prepared were stable and no solid precipitation was visually detectable after standing for 24 hours at room temperature. Neither could any solid matter be separated by gravitational filtration.

Example 3

Coating Test

The following samples were prepared, leaving half of the sample uncoated:
1. As a control experiment, pulp dispersed in [TMGH]OAc·H$_2$O—without Masuko grinding—was spread on a piece of cardboard.
2. Masuko ground pulp from Example 1 was spread on cardboard.
3. Masuko ground pulp from Example 1 was spread on glass.
4. Masuko ground pulp from Example 1 was spread on glass and washed with water.

Figure 6:
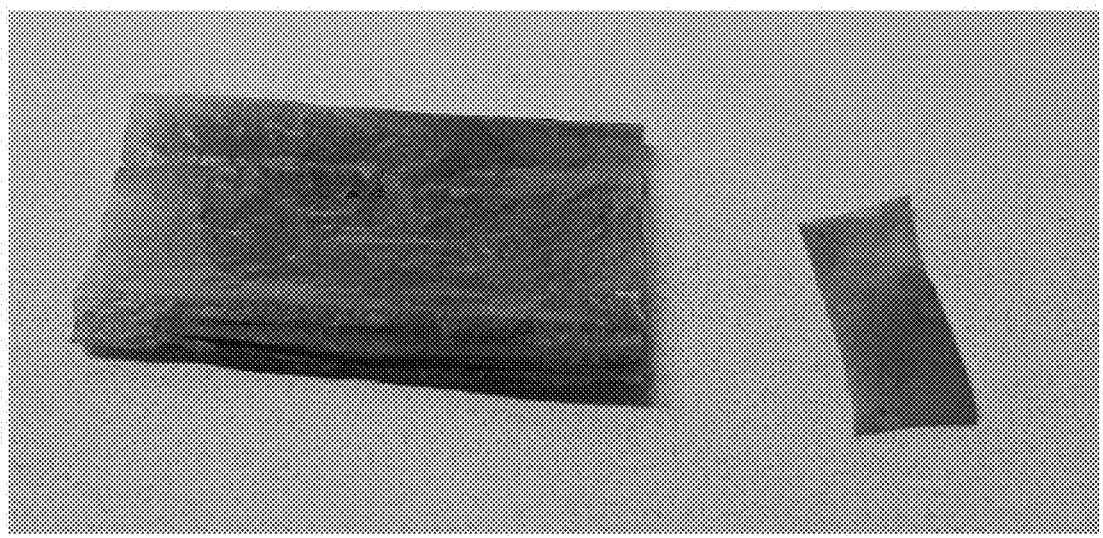
FIG. 6 is a photograph showing an artificial sausage casing made from abaca paper and dissolving pulp Masuko ground in [TMGH]OAc·$H_2O$.

Each sample was then dried in a convection oven at 120° C. for 4 h. Both the water and the ionic liquid were completely evaporated, leaving the regenerated cellulose as a coating. The samples were then tested for water absorption: a drop of water was placed on the treated surface and dried with a stream of argon until the free water surface disappeared (FIG. 6). The sample was weighed before and after.

With this procedure, the untreated cardboard itself absorbed 41 mg of a 50 mg drop of water.

1. The control experiment with unmilled pulp produced a surface with a texture resembling paper, i.e. it was white and partially opaque. The sample absorbed all of the 50 mg drop immediately.
2. The Masuko-ground pulp produced a clear coating. The water drop was dried off completely by the argon stream without being absorbed—no mass gain.
3. A clear film was formed. The film retained 0.6 mg of the 46.8 mg water drop.
4. A translucent film was formed. The film retained 18.4 mg of the 49.1 mg water drop.

In conclusion, without Masuko grinding, however, permeability is increased. Masuko grinding makes the resultant coating solid, which reduces its permeability. Evaporation of the IL instead of washing with water is preferred, as it produces a more solid film. For traditional ILs, removal of the IL by evaporation is not possible, as their vapor pressures are extremely low, and they must be removed by water washing. Thus, our invention improves upon the state of the art.

Figure 5:
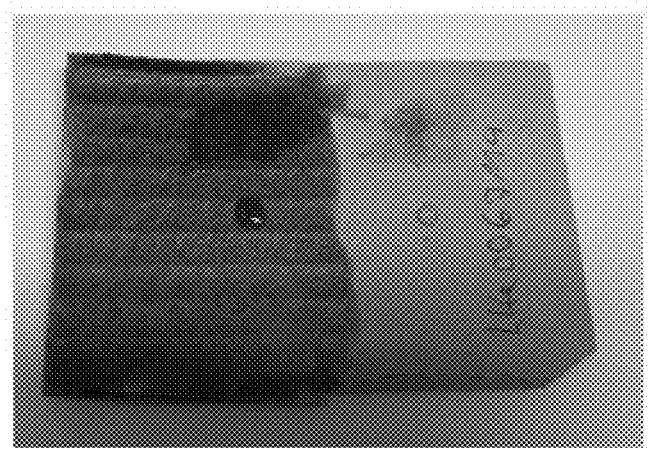

FIG. 5 shows testing for absorption of a drop of water, sample 2 (Masuko ground). Left side: coated side, where water would evaporate nearly completely, vs. right side, untreated cardboard, where water would be mostly retained.

Example 4

Paper additive test. Dispersion from Example 2 (100 g) was slowly added, under strong stirring, into refined paper-grade pulp (8 g) suspended in water. The suspension was diluted to a consistency of 0.1 wt-%. A sheet former was used to bubble air through the suspension, followed by draining with suction through standard papermaking wire. The sheet was dried and processed to obtain a sheet of low-basis weight paper (10 g/m$^2$). Ultimate strength was increased by 30% vs. a control made from only refined paper-grade pulp.

Example 5

Artificial sausage casing test: 127 cm$^2$ of abaca paper (*Musa textilis*, 14.3 g/m$^2$) was impregnated with 600 g/m$^2$ of the 2% dispersion from Example 2. The paper was placed in a 150° C. oven for 2 h, where the [TMGH]OAc·H$_2$O was evaporated. The product was washed with excess water, removing some of the brown color from caramelization. The product was a pliable, reasonably strong all-cellulose composite film, retaining the abaca fibers in a matrix of regenerated cellulose. It had the same look and feel as a commercial thick sausage casing. The material tended to wrinkle when dried in a 120° C. oven, but it could be easily rehydrated back to a pliable film.

FIG. 6 shows an artificial sausage casing made from abaca paper and dissolving pulp Masuko ground in [TMGH]OAc·H$_2$O.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The invention claimed is:

1. A dispersion comprising cellulose fibers dispersed in a mixture of an ionic liquid and a protic antisolvent for cellulose, said ionic liquid being selected from the group of protic salts of organic superbases capable of dissolving cellulose and said dispersion being stable at a temperature of 15 to 30° C. for at least 24 hours, wherein the cellulose fibers have been subjected to mechanical defibration, wherein the dispersion is a colloidal dispersion, and wherein stable signifies that less than 20% of the dispersed solid matter by weight, calculated from the total amount of dispersed matter in the dispersion, will settle out of the dispersion.

2. The dispersion according to claim 1, wherein the cellulose fibers exhibit cellulose I crystallinity.

3. The dispersion according to claim 1, wherein at least 90% by weight of the cellulose fibers are present in undissolved form in the mixture of the ionic liquid and the protic antisolvent.

4. The dispersion according to claim 1, wherein at least 90% by weight of the cellulose fibers present in the dispersion are dispersed in the mixture of the ionic liquid and the protic antisolvent.

5. The dispersion according to claim 1, wherein the dispersion contains less than 15%, hemicellulose, calculated from the total amount of cellulose and hemicellulose present in the dispersion.

6. The dispersion according to claim 1, wherein the cellulose fibers comprise unmodified cellulose fibers of chemical pulp prepared by kraft, polysulphide, sulphite or organosolv pulping; paper grade pulp; dissolving pulp; or combinations thereof, and wherein said chemical pulp has optionally been bleached.

7. The dispersion according to claim 1, wherein the ionic liquid comprises a protic superbase selected from the group consisting of protonated amidines, protonated guanidines, and combinations thereof, wherein the ionic liquid further comprises a counterion of said protic superbase, wherein the counterion comprises an anion selected from chloride, acetate, propionate, or alkylated phosphate, and wherein the anion together with the protic superbase forms the ionic liquid, the ionic liquid having a melting point lower than 150° C.

8. The dispersion according to claim 1, wherein the protic antisolvent is selected from the group consisting of water, alkanol, aromatic alcohols, an alkane acid, n- or iso-alcohols, ethanol, n-propanol, isopropanol, n-butanol, isobutanol, tert-butanol, acetic acid, propionic acid, Brønsted acids combinations thereof, and mixtures thereof.

9. The dispersion according to claim 1, wherein the molar ratio between the protic antisolvent and the ionic liquid is about 1:50 to 50:1.

10. The dispersion according to claim 1, wherein:
the ionic liquid is selected from the group consisting of 1,1,3,3-tetramethylguanidium acetate monohydrate ([TMGH]OAc·$H_2$O); 1,5-diazabicyclo[4.3.0]non-5-enium acetate dihydrate ([DBNH]OAc·2$H_2$O); 7-methyl-1,5,7-triazabicyclo[4.4.0]dec-5-enium acetate trihydrate ([MTBDH]OAc·3$H_2$O); and 1,5-diazabicyclo[4.3.0]non-5-enium acetate with 0.3 equivalents of acetic acid ([DBNH]OAc·0.3AcOH), and
the protic antisolvent is selected from the group consisting of water, an n- or iso-alcohol, ethanol, n-propanol, isopropanol, n-butanol, isobutanol, acetic acid, propionic acid, and combinations thereof.

11. The dispersion according to claim 1, comprising 0.01 to 30 cellulose, calculated based on the weight of the mixture of the ionic liquid and the protic antisolvent for cellulose.

12. The dispersion according to claim 1, wherein less than 10% by weight of the total weight of dispersed fibers settles out from the dispersion over a time period of 24 hours or more, upon standing at room temperature.

13. A method of producing a dispersion comprising cellulose fibers dispersed in a dispersion medium, comprising the steps of:
providing a cellulose feedstock comprising cellulose fibers;
providing a mixture of an ionic liquid and a protic antisolvent for cellulose as a dispersion medium, the ionic liquid being selected from the group consisting of protic salts of superbases capable of dissolving cellulose; and
mixing said cellulose feedstock into said dispersion medium so as to disperse the cellulose fibers therein to form the dispersion, which is stable for at least 24 hours at a temperature of 15 to 30° C.,
wherein the cellulose fibers have been subjected to mechanical defibration,
wherein the dispersion is colloidal, and
wherein stable signifies that less than 20% of the dispersed solid matter by weight, calculated from the total amount of dispersed matter in the dispersion, will settle out of the dispersion.

14. The method according to claim 13, wherein the molar ratio of the protic antisolvent to the ionic liquid is selected such that the cellulose fibers dispersed exhibit cellulose I crystallinity.

15. The method according to claim 13, wherein the dispersion is subjected to mechanical defibration before, during, or after dispersion of the cellulose fibers in the mixture of the ionic liquid and the protic antisolvent.

16. The method according to claim 13, wherein the dispersion of the cellulose feedstock is carried out while essentially preventing gelling or dissolution of the cellulose fibers in the dispersion medium.

17. The method according to claim 13, wherein the protic superbases comprises a member selected from the group consisting of protonated amidines, protonated guanidines, and combinations thereof, wherein the protic superbases comprise a counterion, the counterion of said protic superbases being an anion, wherein said anion is selected from chloride, acetate, propionate, or alkylated phosphate, and wherein said counterion together with the superbase forms the ionic liquid, the ionic liquid having a melting point lower than 150° C.

18. The method according to claim 13, wherein the protic antisolvent is selected from the group consisting of OH-group-containing liquids, water, alkanol, aromatic alcohols, alkane acid, n- or iso-alcohols, ethanol, n-propanol, isopropanol, n-butanol, isobutanol, tert-butanol, acetic acid, propionic acid, Brønsted acids, combinations thereof, and mixtures thereof.

19. The method according to claim 13, wherein:
the ionic liquid selected from the group consisting of 1,1,3,3-tetramethylguanidium acetate monohydrate ([TMGH]OAc·$H_2$O); 1,5-diazabicyclo[4.3.0]non-5-enium acetate dihydrate ([DBNH]OAc·2$H_2$O); 7-methyl-1,5,7-triazabicyclo[4.4.0]dec-5-enium acetate trihydrate ([MTBDH]OAc·3$H_2$O); and 1,5-diazabicyclo[4.3.0]non-5-enium acetate with 0.3 equivalents of acetic acid ([DBNH]OAc·0.3AcOH), and
the protic antisolvent is selected from the group consisting of water, an n- or iso-alcohol, ethanol, n-propanol, isopropanol, n-butanol, isobutanol, tert-butanol, acetic acid, and combinations thereof.

20. A method for making a modified cellulose pulp slurry comprising mixing the dispersion of cellulose fibers of claim 1 into an aqueous slurry of cellulose pulp to form the modified cellulose pulp slurry.

* * * * *